United States Patent [19]

Monteyne

[11] 4,289,519
[45] * Sep. 15, 1981

[54] METHOD OF DEWATERING GRANULATED-SLAG SLURRY

[75] Inventor: Guido Monteyne, Lembeke, Belgium

[73] Assignee: SIDMAR Maritieme Staalnijverheid NV., Siderurgie Maritime S.A., Gent, Belgium

[*] Notice: The portion of the term of this patent subsequent to May 27, 1997, has been disclaimed.

[21] Appl. No.: 110,253

[22] Filed: Jan. 7, 1980

Related U.S. Application Data

[63] Continuation-in-part of Ser. No. 29,076, Apr. 11, 1979, Pat. No. 4,204,855.

[30] Foreign Application Priority Data

Apr. 18, 1978 [LU] Luxembourg .......................... 79466

[51] Int. Cl.³ ............................................ C03B 37/00
[52] U.S. Cl. ........................................ 65/19; 65/141; 210/307; 210/394; 210/524
[58] Field of Search .................... 65/19, 20, 141; 210/297, 307, 394, 523, 524, 526

[56] References Cited

U.S. PATENT DOCUMENTS

| Re. 18,598 | 9/1932 | Shimmin | 210/394 X |
|---|---|---|---|
| 1,115,321 | 10/1914 | Lessing | 65/19 |
| 3,615,329 | 10/1971 | Jones | 65/141 |
| 3,654,708 | 2/1972 | Grady | 65/19 |
| 3,738,820 | 6/1973 | Osborne et al. | 65/19 |
| 4,046,541 | 9/1977 | Anderson | 65/19 |

*Primary Examiner*—Robert L. Lindsay, Jr.
*Attorney, Agent, or Firm*—Karl F. Ross

[57] ABSTRACT

Molten slag is granulated with water to produce a granulated-slag/water slurry that is fed into the bottom of a horizontally extending foraminous drum. This drum has radially inwardly extending vanes and is rotated to lift up the granulated slag and separate it from the water, discharging the slag onto a conveyor belt for storage or further use. The water running out of the slag slurry is recirculated for use in the initial granulation step for the molten slag stream.

8 Claims, 5 Drawing Figures

METHOD OF DEWATERING GRANULATED-SLAG SLURRY

CROSS-REFERENCE TO RELATED APPLICATIONS

This is a continuation-in-part of corresponding application 029,076 filed Apr. 11, 1979 now U.S. Pat. No. 4,204,855, granted May 27, 1980.

FIELD OF THE INVENTION

The present invention relates to a method of treating molten slag. More particularly this invention concerns a method for continuously reducing molten slag to granulates and for substantially drying these granules.

BACKGROUND OF THE INVENTION

Slag, such as produced by a blast furnace, is a valuable byproduct of a smelting operation. For storage, transport, and use of slag it must be converted from its molten viscous form into granules of manageable particle size. Typically the molten slag is mixed with water which serves simultaneously to chill it and break it up into granules. A typical granulation process, such as described in commonly owned U.S. Pat. No. 4,123,247, produces a so-called fluent slag slurry, that is a mixture of slag granules and water.

It is necessary to separate the water from the granulated slag so that this granulated slag can be stored, transported, and used. In a common method for doing this the slag slurry is poured into a large basin where the heavier granules sediment out so that the water can be decanted or poured off. The granules are then removed from the basin by a skip loader, shovel arrangement or other mechanical means.

It is also known to pump the slag up into a tall hopper having a foraminous floor. The water in the slag can slowly drain from it, passing slowly through the relatively thick layer of slag granules in the hopper.

Both of these arrangements have the considerable disadvantage that they take up a great deal of space. As both processes rely on sedimentation of a large mass of the slurry, they take considerable time so that several basins or hoppers must be provided if slag slurry is being produced continuously. Obviously the space is not available for such an installation in conventional smelting plants. Furthermore the considerable handling that the relatively brittle slag granules are subjected to in such an arrangement produces a considerable percentage of fines of unmanageably small particle size.

OBJECTS OF THE INVENTION

It is therefore an object of the present invention to provide an improved method of treating slag.

Another object is to provide an improved method of continuously separating the water out of a granulated-slag slurry.

Another object is to provide an installation for carrying out this method which takes up a minimal amount of floor space, yet which has a capacity that can be varied up to a relatively high level.

SUMMARY OF THE INVENTION

These objects are attained according to the instant invention by feeding the granulated-slag/water slurry at one location onto an endless foraminous substrate that is continuously displaced to another unloading location. As the slag slurry, which forms a relatively thin layer on the substrate, moves from the one location to the other location most of the water runs off through it so that the granules still present on the substrate at the other location can be loaded directly onto a conveyor for storage, transport, or use.

According to this invention the substrate is a foraminous cylindrical drum rotated about its central axis. Radially inwardly projecting vanes on the drum conduct the slag slurry from the bottom of the drum where it is loaded in to the top of the drum where it falls down onto a conveyor extending axially into the drum. In fact the lower portion of the drum according to this invention lies in a vessel below the liquid level therein, so that the slag slurry is handled very gently, thereby avoiding the production of unnecessary fines by this separation method.

According to another feature of this invention the water separated out of the slag slurry is fed, in some cases after being cooled, back to the granulation apparatus which may be of the type described in commonly owned U.S. Pat. No. 4,123,247. Thus it is not necessary to subject this water to an expensive subsequent cleaning and treatment, as re-using it in the granulating apparatus will automatically recombine whatever slag remains in this water into the slurry again. In fact the system according to this invention will be environmentally extremely neat in that whatever vapors are produced will be relatively easy to scrub, and the particle-carrying water separated out of the slurry can be re-used.

It is also possible according to this invention to form the vessel underneath the drum with a partition so that the water draining out of the slurry can be separated into a particle-laden fraction and a relatively particle-free fraction. This particle-free fraction comprises about 80% by weight and is cooled before being fed back to the granulation apparatus, whereas the particle-rich fraction which comprises some 15% to 20% by weight is fed back directly. Thus the cooling apparatus is not subjected to the abrasive action of the particles.

According to further features of this invention the drum is cylindrical and is formed by a relatively rigid outer wall lined with a screen having a fine mesh size. The outer wall can be a heavy screen having a large mesh size or a perforated sheet-metal structure. In addition the vanes are also foraminous and of relatively large mesh. In this manner as the slag is orbited upwardly on the drum it will be effectively stripped of its water. As the layer of slag formed on the wall and vanes of the drum is relatively thin such separation will produce relatively dry slag granules. The conveyor extends axially into the drum and may be a simple conveyor belt, auger arrangement, vibrating table, or any other convenient particle-transporting system. As the slag granules will still be rather hot even at this late stage, they will dry further while being transported away in a thin layer.

The slag slurry is fed into the drum by means of a conduit having a variable restriction that can alter the flow cross section of this conduit to compensate for different feed rates. Baffles are provided at the end of the conduit, which lies wholly beneath the water level inside the drum, to distribute the slag evenly axially over the drum at the one lower location. In this manner the slag granules remain for as much time as possible in a liquid medium, so that they are handled quite gently. Thus useless fines are not produced.

In order to ensure good separation of the granules from the slurry, it is possible according to this invention to vibrate the drum. Furthermore jets of compressed air may be directed through the foraminous drum from outside at the unloading location to ensure complete stripping-off of the filter cake formed by the slag granules.

The system according to the instant invention works equally well with a slurry having a high percentage of water, as for example when the slurry must be transported a long distance through conduits without excessive production of fines. It can also work effectively with the slurry directly as it is produced from the granulating apparatus as described in the second above-cited and commonly owned patent. The finished product will be substantially the same regardless of the dilution of the slurry.

SPECIFIC DESCRIPTION

Figure 1:
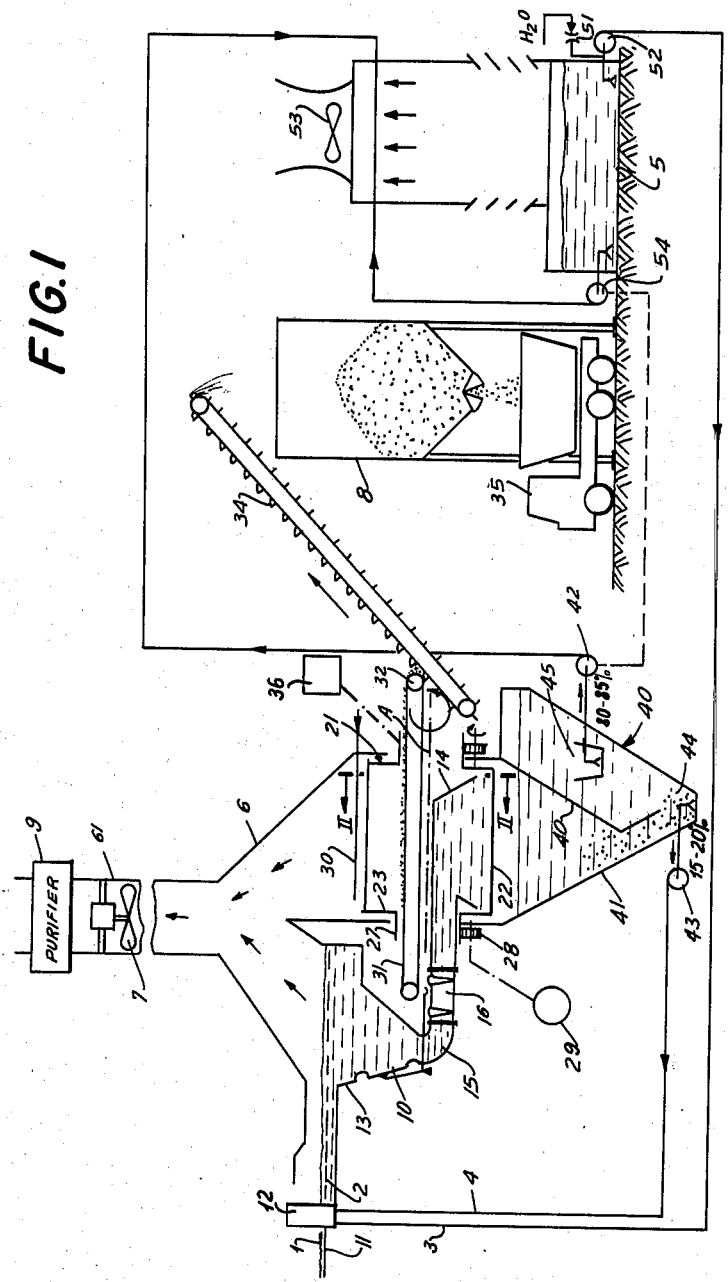
FIG. 1 is a sectional and largely schematic view of a system for carrying out the method according to this invention.

As shown in FIG. 1 a stream 1 of molten slag in a trough or channel 11 enters a water-type slag granulator 12 which may be of the type described in commonly owned U.S. Pat. No. 4,123,247. This device 12 has a pair of inputs 3 and 4 for water and produces a slurry 2 comprised of slag granules in water. In the device 12 water under pressure is mixed with the molten slag so as to chill and crystallize it, simultaneously breaking it up into hard granules.

The slag slurry 2 then flows into a collector vessel 13 provided underneath an exhaust hood 6 connected to an exhaust conduit 61 provided with a fan 7 and with a purifier 9 that strips noxious vapors and particles from the gas stream in the conduit 61.

The collector vessel 13 has a lower drain 15 connected via a restriction 16 to a feed pipe 14. A movable wall portion 10 is connected to the restriction 16 so as to vary its size in accordance with the depth of the slurry inside the collector vessel 13.

Figure 2:
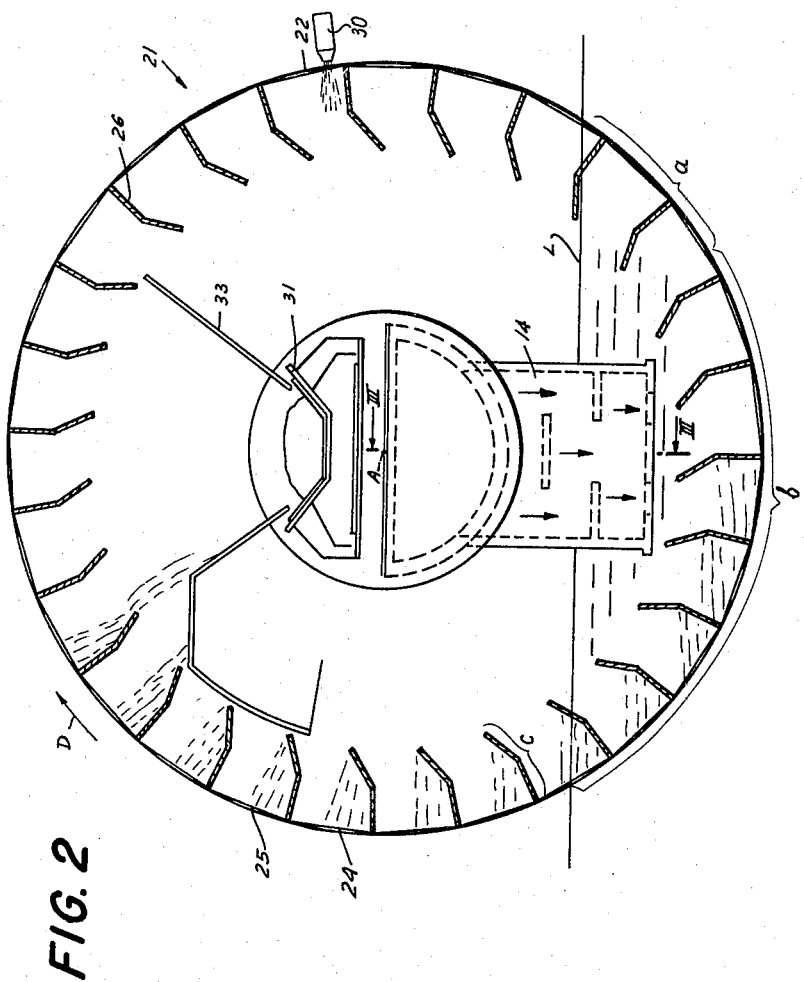
FIG. 2 is a section taken along line II—II of FIG. 1.
Figure 2A:
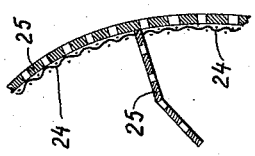
FIG. 2A is a large-scale view of a detail of FIG. 2.
Figure 4:
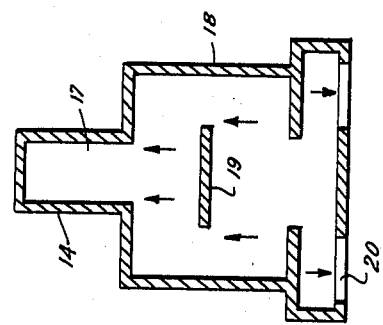
FIG. 4 is a section taken along line IV—IV of FIG. 3.
Figure 3:
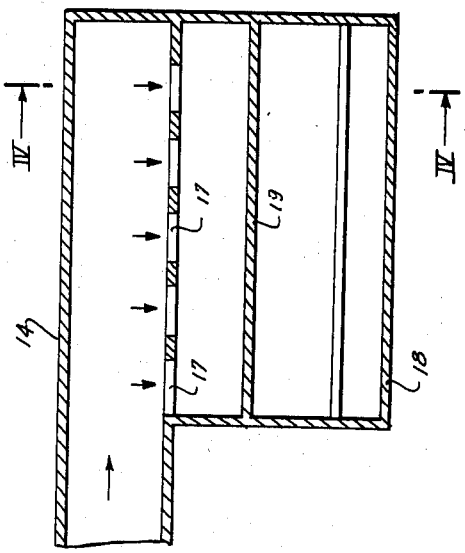
FIG. 3 is a section taken along line III—III of FIG. 2.

As shown in FIGS. 3 and 4 the conduit 14 is closed at one end and formed with a plurality of downwardly opening holes 17 opening into a chamber 18 provided with a baffle 19 so that the mixture will be distributed along the entire length of the chamber 18 to leave it via laterally offset holes 20. This end of the conduit 14 is provided below an axis A of a cylindrical drum 22 of a separator 21 also shown in FIG. 2. This drum 22 has end walls 23 from which extend cylindrical collars 27 supported on gears 28 driven by a motor 29 to rotate the drum 22 about the axis A. The drum 22 in turn is formed as seen in FIG. 2 of a fine-mesh inner wall 24 supported on a heavier-duty outer wall 25 which may be a perforated metal wall having a larger mesh size than the lining 24 or may be a heavier screen. In addition this drum 22 has radially inwardly extending scoop-type vanes 26 at least partially inclined at this inner edges into the direction of rotation D of the drum 22 about the axis A and formed of foraminous material of the same relatively large mesh size as the outer wall 25. The restriction 16 is normally varied to maintain a liquid level L inside the drum 22 which is well below the axis A, but below which the drum 22 is still partially submerged.

The drum 22 may be connected to a vibrator 36 which ensures good separation of granules from the drum to prevent it from caking up. In addition immediately above the uppermost portion of the drum is an axially extending row of nozzles 30 which direct blasts of compressed air downwardly through the foraminous drum 22.

A collector or decanting vessel 41 underneath the drum 22 is subdivided by a partition 40 and has at its lower end the intake for a pump 43 connected to the one input 4 of the device 12. On the other side of the partition 40 this vessel 41 is provided well above the intake for the pump 43 with a vessel 45 in which is provided the intake for a pump 42 whose output is fed to a cooling tower 53. A reservoir 5 underneath this cooling tower 53 is connected to the input of another pump 54 for recirculation of the water in the reservoir 5 through the tower 53. In addition the intake of a pump 52 lies within the reservoir 5, the output of this pump 52 being connected to the input 3 for the granulating device 12. A freshwater input 51 is provided also at the intake of the pump 52.

Underneath the uppermost portion of the drum 22 is a collecting funnel 33 that empties onto a belt 31 extending axially through the drum 22 and supported at its ends on rollers 32 which may be driven by the motor 29. This belt 31 empties onto an upwardly extending belt 34 which terminates above a hopper 8 where granulated slag may be stored for eventual transport away by means of a truck 35.

Thus with the device described above the granulated-slag/water slurry 2 is fed into the bottom of the drum 22, being distributed axially along this drum 22 by means of the baffled conduit 14. As the motor 29 rotates the drum 22 the vanes 26 will catch the solid phase of the slurry and conduct it up above the level L so that water will drain out of the slurry through the foraminous walls of the drum 22 and vanes 26. As the vanes 26 move above the funnel 33 the dewatered granulated slag will be discharged downwardly into the funnel 33. The jets of air from the nozzles 30 will ensure complete stripping of the granulated slag off the foraminous drum to prevent clogging of it.

More particularly as the drum 22 rotates in direction D there will be only a minor amount of particles clinging to it and forming a filter cake in the region indicated in FIG. 2 at a. In this region a, which forms approximately 10% of the submerged area of the drum 22, approximately 80% of the water that flows through the drum 22 will pass. In the submerged region indicated at b in FIG. 2 there is considerable particle buildup on the inner drum wall, so that even though this region b accounts for approximately 90% of the submerged area of the drum, only about 20% of the water that passes through the drum will traverse at this location. Hence extremely rapid filtration and good separation is obtained. In addition the vanes 26, which are of relatively large mesh, constitute areas c through which considerable flow can take place, so that as the slurry is lifted up on these vanes 26 the water in it flows through them at c and into the interior of the drum, to pass eventually off through the region a.

The funnel 33 will empty the granulated slag onto the belt 31 which will carry it to the belt 34 and thence to the hopper 8.

The water filtered out of the granulated slag will settle in the vessel 41. A relatively particle-laden fraction comprising some 15%–20% by weight of the water will be taken up by the pump 43 and used for granulation of the slag directly at the apparatus 12. A relatively particle-free fraction comprising by weight 80%–85% will be taken up by the pump 42 and cooled in the tower 53 before being circulated back to the granulating apparatus 12. The particle-free fraction is at least three times as large as the particle-laden fraction.

Such a system therefore ensures that the granulated slag will be handled as little as possible. Thus the production of useless fines is largely eliminated, so that slag of good granulometry is produced. Furthermore the water filtered out of the slag presents no complex disposal or filtration problem, since it is used itself to granulate the incoming slag. The system can operate continuously and can easily be adjusted to compensate for any input rate for the molten slag system 1. Furthermore the entire arrangement takes up only a limited amount of space, so that it can be provided immediately adjacent a blast furnace for continous treatment of the slag as it issues from the blast furnace.

I claim:

1. A method of treating a stream of molten slag, said method comprising the steps of continuously and concomitantly:
    granulating said stream of molten slag with water to produce a granulated-slag/water slurry;
    feeding said slurry at a relatively low location onto the inside surface of an endless and annular foraminous substrate;
    rotating said substrate to lift said slurry to a relatively high location so that water runs off through said substrate and said slag is dewatered;
    dropping the dewatered granulated slag from said substrate at said high location onto a conveyor within said annular substrate; and
    transporting the dewatered slag with said conveyor away from said substrate.

2. The method defined in claim 1 wherein said substrate is a foraminous drum that is rotated about its central axis.

3. The method defined in claim 1, further comprising the steps of using the water separated from said slurry in the granulation of said stream and production of said slurry.

4. The method defined in claim 3, further comprising the step of decanting the water separated from said slurry into a particle-laden fraction used directly for said granulation, and a relatively particle-free fraction, and cooling said particle-free fraction prior to using same for said granulation.

5. The method defined in claim 4 wherein said particle-free fraction is substantially greater by weight than said particle-laden fraction.

6. The method defined in claim 5 wherein said particle-free fraction is greater by weight by a factor of at least three than said particle-laden fraction.

7. The method defined in claim 1, further comprising the step of stripping said granulated slag from said substrate at said relatively high location with a blast of compressed gas.

8. A method of treating a stream of molten slag, said method comprising the steps of continuously and concomitantly:
    granulating said stream of molten slag with process water to produce a granulated-slag/water slurry;
    feeding said slurry at a relatively low location onto the inside surface of a foraminous drum having a central axis;
    rotating said drum about said axis to lift said slurry to a relatively high location so that water runs off through said substrate and said slag is dewatered;
    driving the dewatered granulated slag from said substrate at said high location with a compressed-gas stream and dropping said dewatered granulated slag from said substrate at said high location onto a conveyor within said drum;
    transporting the dewatered slag driven and dropped from said substrate away from said substrate with said conveyor;
    decanting the water separated from said slurry into a particle-laden fraction and a particle-free fraction;
    using said particle-laden fraction as said process water in the granulation step; and
    cooling said particle-free fraction.

* * * * *